United States Patent
Yamagishi

(10) Patent No.: US 11,514,461 B2
(45) Date of Patent: Nov. 29, 2022

(54) CUSTOMER SERVICE ASSISTANCE SYSTEM AND CUSTOMER SERVICE ASSISTANCE METHOD

(71) Applicant: HITACHI, LTD., Tokyo (JP)

(72) Inventor: Takashi Yamagishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/980,874

(22) PCT Filed: Mar. 27, 2018

(86) PCT No.: PCT/JP2018/012319
§ 371 (c)(1),
(2) Date: Sep. 15, 2020

(87) PCT Pub. No.: WO2019/186678
PCT Pub. Date: Oct. 3, 2019

(65) Prior Publication Data
US 2021/0012352 A1    Jan. 14, 2021

(51) Int. Cl.
*G06Q 30/00* (2012.01)
*G06Q 10/10* (2012.01)
(Continued)

(52) U.S. Cl.
CPC ....... *G06Q 30/016* (2013.01); *G06F 16/3329* (2019.01); *G06F 16/9535* (2019.01);
(Continued)

(58) Field of Classification Search
CPC .. G06Q 30/016; G06Q 10/10; G06Q 30/0185; G06F 16/3329; G06F 16/9535;
(Continued)

(56) References Cited

U.S. PATENT DOCUMENTS

2016/0247068 A1* 8/2016 Lin ................... G06N 5/02
2017/0017695 A1* 1/2017 Higuchi ............. G06F 16/3329
2017/0330557 A1  11/2017 Pattan et al.

FOREIGN PATENT DOCUMENTS

CN   107609056 A   1/2018
CN   107679159 A   2/2018
(Continued)

OTHER PUBLICATIONS

International Search Report of PCT/JP2018/012319 dated Jun. 19, 2018.
(Continued)

*Primary Examiner* — Sangeeta Bahl
(74) *Attorney, Agent, or Firm* — Mattingly & Malur, PC

(57) ABSTRACT

A customer service assistance system includes: storage device that stores an address of an automated response device accumulating knowledge of a provided business in the output screen; and an arithmetic device that, when an inquiry specifying the address is received from a customer terminal, checks identification information of the output screen and an inquiry sentence indicated by the inquiry against questions-and-answers information held for each output screen of the provided business in the automated response device associated with the address, estimates a question matching an intention of the inquiry out of questions in the questions-and-answers information according to whether a screen associated with each question included in the questions-and-answers information matches the output screen and a degree of similarity between a sentence of each question included in the questions-and-answers information and the inquiry sentence, and extracts an answer to the question, and returns the answer to the customer terminal.

2 Claims, 12 Drawing Sheets

(51) Int. Cl.
- *G06N 20/00* (2019.01)
- *G06F 16/332* (2019.01)
- *G06F 16/9535* (2019.01)
- *G06F 40/279* (2020.01)

(52) U.S. Cl.
CPC .......... *G06F 40/279* (2020.01); *G06N 20/00* (2019.01); *G06Q 10/10* (2013.01); *G06Q 30/0185* (2013.01)

(58) Field of Classification Search
CPC .. G06F 40/279; G06F 40/35; G06F 16/90332; G06N 20/00; G06N 3/006; H04M 3/42382; H04M 3/493; H04L 51/02
See application file for complete search history.

(56) References Cited

FOREIGN PATENT DOCUMENTS

| | | |
|---|---|---|
| JP | 2003-044487 A | 2/2003 |
| JP | 2004-038535 A | 2/2004 |
| JP | 2007-102584 A | 4/2007 |
| JP | 2009-288827 A | 12/2009 |
| JP | 2017-027208 A | 2/2017 |

OTHER PUBLICATIONS

Singaporean Office Action received in corresponding Singaporean Application No. 11202008856V dated Jul. 1, 2022.

\* cited by examiner

URL MANAGEMENT INFORMATION 125

| URL | SCREEN ID | BUSINESS | SCREEN ID | REGION ID | LINK DESTINATION URL |
|---|---|---|---|---|---|
| https://xxxxxx.xx001 | Axxx001 | ACCOUNT ACTIVITY RECORD INQUIRY | Axxx001 | — | https://xxxxx.001A |
| ... | ... | ... | ... | ... | ... |
| https://xxxxxx.xx003 | Bxxx001 | FUND TRANSFERS | Bxxx001 | — | https://xxxxx.xx003A |
| https://xxxxxx.xx004 | Bxxx002 | FUND TRANSFERS | Bxxx001 | — | https://xxxxx.xx004A |
| https://xxxxxx.xx005 | Zxxx001 | ID/PW AUTHENTICATION | Zxxx001 | Z001A | https://xxxxx.xx005A |
| | | | | Z001B | https://xxxxx.xx006B |
| ... | ... | ... | ... | ... | ... |

FIG. 3

FAQ MANAGEMENT INFORMATION

126

| MANAGEMENT NUMBER | CLASSIFICATION | BUSINESS | SCREEN ID | REGION ID | ERROR CODE | QUESTION | ANSWER |
|---|---|---|---|---|---|---|---|
| 001 | AUTHENTICATION | ELECTRONIC CERTIFICATE | Uxxx005 | — | — | FOR OBTAINING ELECTRONIC CERTIFICATE~ | PLEASE CHECK ○○. |
| 002 | | | | — | — | EXPIRATION DATE OF CERTIFICATE IS~ | EXPIRATION DATE OF CERTIFICATE IS~ |
| 003 | | | | — | — | ○○○~ | △△△△~ |
| 004 | ONLINE | FUND TRANSFERS | Bxxx001 | — | 4301E | ACCOUNT NUMBER OF RECEIVER DURING TRANSFER IS~ | PLEASE CHECK IF △△△ IS CORRECT. |
| 005 | | | | — | — | □□~ | □□□~ |
| 006 | | | Bxxx002 | — | — | | |
| 007 | AUTHENTICATION | ID/PW AUTHENTICATION | Zxxx001 | Z001A | — | I FORGOT ACCOUNT NUMBER~ | PLEASE CONTACT ○○○. |
| 008 | | | | Z001B | 5002E | THERE APPEARS ○○ ERROR~ | PLEASE CHECK NUMBER OF DIGITS AND TYPE OF LETTERS INPUTTED. |
| 009 | ONLINE | ACCOUNT ACTIVITY RECORD INQUIRY | Axxx001 | — | — | IN SPECIFYING OF REFERENCE REGION~ | RECORDS OF PAST 31 DAYS CAN BE REFERRED. |
| 010 | | | Axxx002 | — | — | WHEN SPECIFYING BY WEEKS~ | IT IS POSSIBLE TO MAKE REFERENCE BY WEEK OF ○○. |
| 011 | | | Axxx003 | — | — | WHEN SPECIFYING BY DATE AND TIME~ | IT IS POSSIBLE TO MAKE REFERENCE BY □□. |
| ... | ... | ... | ... | ... | ... | ... | ... |

FIG. 4

MATCH-RATE CONVERSION INFORMATION 127

| QUESTION CONTENTS MATCH-RATE | MATCHING POINT |
| --- | --- |
| 0.9 OR MORE AND 1.0 OR LESS | 40P |
| 0.8 OR MORE AND LESS THAN 0.9 | 30P |
| 0.7 OR MORE AND LESS THAN 0.8 | 20P |
| 0.6 OR MORE AND LESS THAN 0.7 | 10P |
| 0.5 OR MORE AND LESS THAN 0.6 | 5P |

FIG. 5

DETERMINATION INFORMATION

| PRIORITY | MANAGEMENT NUMBER | DETERMINATION POINT | SCREEN MATCHING POINT | ERROR CODE MATCHING POINT | QUESTION CONTENTS MATCHING POINT |
|---|---|---|---|---|---|
| 1 | 0000021 | 90P | 30P | 30P | 30P |
| 2 | 0000015 | 50P | 30P | 0 | 20P |
| 3 | 0000036 | 40P | 30P | 0 | 10P |
| 4 | 0000004 | 30P | 0 | 0 | 0 |
| 5 | 0000029 | 30P | 30P | 0 | 30P |

※PRIORITY CAN BE MADE BY MAKING SCREEN MATCHING POINT PRIOR WHEN DETERMINATION POINT TIES, FOR EXAMPLE

ANSWERING AS ANSWER WITH HIGHEST POSSIBILITY

POINT OF PRESENT INVENTION

FIG. 6

PRIORITY INFORMATION

| QUESTION CONTENTS MATCH-RATE | PRIORITY |
|---|---|
| SCREEN MATCHING POINT | 1 |
| ERROR CODE MATCHING POINT | 2 |
| QUESTION CONTENTS MATCHING POINT | 3 |

DETERMINATION RESULT INFORMATION 130

| MANAGEMENT NUMBER | CLASSIFICATION | BUSINESS | SCREEN ID | REGION ID | ERROR CODE | QUESTION | ANSWER |
|---|---|---|---|---|---|---|---|
| 001 | AUTHENTICATION | ELECTRONIC CERTIFICATE AUTHENTICATION | Uxxx005 | – | – | FOR OBTAINING ELECTRONIC CERTIFICATE~ | PLEASE CHECK ○○. |
| 002 | | | | | – | EXPIRATION DATE OF CERTIFICATE IS~ | EXPIRATION DATE OF CERTIFICATE IS~ |
| 003 | | | | | – | ○○○~ | △△△△~ |
| ... | ... | ... | ... | ... | ... | ... | ... |
| 007 | AUTHENTICATION | ID/PW AUTHENTICATION | Zxxx001 | Z001A | – | I FORGOT ACCOUNT NUMBER~ | PLEASE CONTACT ○○○. |
| 008 | | | | Z001B | 5002E | THERE APPEARS ○○ ERROR~ | PLEASE CHECK NUMBER OF DIGITS AND TYPE OF LETTERS INPUTTED. |
| ... | ... | ... | ... | ... | ... | ... | ... |

| SCREEN MATCHING | ERROR CODE MATCHING | QUESTION CONTENTS MATCHING | TOTAL SCORE |
|---|---|---|---|
| – | – | – | – |
| – | – | – | – |
| – | – | – | – |
| ... | ... | ... | ... |
| 30P | 0 | 20P | 50P |
| 30P | 30P | 10P | 70P |
| ... | ... | ... | ... |

FIG. 12

CUSTOMER SERVICE ASSISTANCE SYSTEM AND CUSTOMER SERVICE ASSISTANCE METHOD

TECHNICAL FIELD

The present invention relates to a customer service assistance system and a customer service assistance method.

BACKGROUND ART

In recent years, in order to improve efficiency in the call center business, there are proposed various types of so-called automated response services, such as the automated voice response and the response by a chatbot on the Web.

On the other hand, there are various types of attributes of the users of such an automated response service, and also there are many users who have difficulty in asking a precise question to the service.

In this case, it is likely to be difficult for the automated response service side to quickly and accurately understand the intention of the user, and it is likely to result in making the user dissatisfied.

To deal with this, there are proposed an inquiry-response assistance system for each customer (see Patent Literature 1) and the like as a technique for facilitating the understanding of the intention of the user, and, for example, the inquiry-response assistance system for each customer assists with the response to an inquiry from each customer by using menu information on a predetermined web screen browsed through a terminal held by the customer and comprises: a customer information obtainment unit that obtains customer identification information for identifying each customer and a transition pattern of a web screen used by each customer as screen transition information; an association unit that associates the obtained customer identification information and screen transition information as information-on-each-customer of a corresponding customer based on predetermined information; a management database that includes at least a customer information database that stores customer information including the customer identification information, a transition pattern management database that stores inquiry contents supposed for each transition pattern of the web screen in advance, and a screen transition information database that stores and manages the transition pattern of the web screen obtained from the customer as the screen transition information; and an inquiry contents supposing unit that supposes inquiry contents in advance for each customer based on the screen transition pattern included in the screen transition information with reference to the management database.

CITATION LIST

Patent Literature

[PTL 1] Japanese Patent Application Publication No. 2007-102584

SUMMARY OF INVENTION

Technical Problem

Conventionally, in usual cases, a system providing the automated response service responds to enormous questions about each of a wide variety of businesses and technical fields only by the single system itself, for example.

In such a case, even though the above-described system learns the response contents that should be generated for a certain question by machine learning and the like, the types of the questions that should be processed vary widely, and a proportionate period of time is required to achieve a suitable accuracy in the response contents. Additionally, since the enormous questions about a broad range of fields are processed and learned, the load on the system is likely to be large as well.

Consequently, there may be a risk that the state of holding the massive resource is continued while good response contents are not generated smoothly. Particularly, it is considered that this tendency becomes stronger when the automated response service is provided for a professional business or a business related to high technology.

Then, since the automated response service cannot quickly return a suitable answer, the understanding of a user intention delays with an operation of asking the user performed repeatedly, for example, and thus the user satisfaction level is likely to be low. On the other hand, on the side of the provider of the automated response service, there is a problem of high cost due to the need for a capital proportionate to the equipment investment and the like for maintaining and improving the user satisfaction level.

Therefore, an object of the present invention is to provide a technique for efficiently performing a precise understanding of a user intention and automated response with suitable contents.

Solution to Problem

A customer service assistance system of the present invention that solves the above problems includes:

a storage device that stores, for each output screen in a business system as a target of inquiry from a customer, an address of an automated response device accumulating knowledge of a provided business in the output screen; and an arithmetic device that when an inquiry specifying the address is received from the customer terminal, executes processing of checking identification information of the output screen and an inquiry sentence indicated by the inquiry against questions-and-answers information held for each output screen of the provided business in the automated response device associated with the address, and estimating a question matching an intention of the inquiry out of questions in the questions-and-answers information according to whether a screen associated with each question included in the questions-and-answers information matches the output screen and a degree of similarity between a sentence of each question included in the questions-and-answers information and the inquiry sentence, and processing of extracting an answer to the estimated question from the questions-and-answers information and returning the answer to the customer terminal.

Additionally, a customer service assistance method of the present invention is performed by an information processing system including a storage device that stores, for each output screen in a business system as a target of inquiry from a customer, an address of an automated response device accumulating knowledge of a provided business in the output screen, the information processing system, when an inquiry specifying the address is received from the customer terminal, executing processing of checking identification information of the output screen and an inquiry sentence indicated by the inquiry against questions-and-answers information held for each output screen of the provided business in the automated response device associated with the address, and estimating a question matching an intention of the inquiry out of questions in the questions-and-answers information according to whether a screen associated with each question included in the questions-and-answers information matches the output screen and a degree of similarity between a sentence of each question included in the questions-and-answers information and the inquiry sentence, and processing of extracting an answer to the estimated question from the questions-and-answers information and returning the answer to the customer terminal.

Advantageous Effects of Invention

According to the present invention, it is possible to efficiently perform a precise understanding of a user intention and automated response with suitable contents.

BRIEF DESCRIPTION OF DRAWINGS

FIG. 3 is a diagram illustrating a data configuration example of URL management information in this embodiment.

FIG. 4 is a diagram illustrating a data configuration example of FAQ management information in this embodiment.

FIG. 5 is a diagram illustrating a data configuration example of match-rate conversion information in this embodiment.

FIG. 6 is a diagram illustrating a data configuration example of determination information in this embodiment.

FIG. 7 is a diagram illustrating a data configuration example of priority information in this embodiment.

FIG. 12 is a diagram illustrating a data configuration example of determination result information in this embodiment.

DESCRIPTION OF EMBODIMENT

—Network Configuration—

Figure 1:
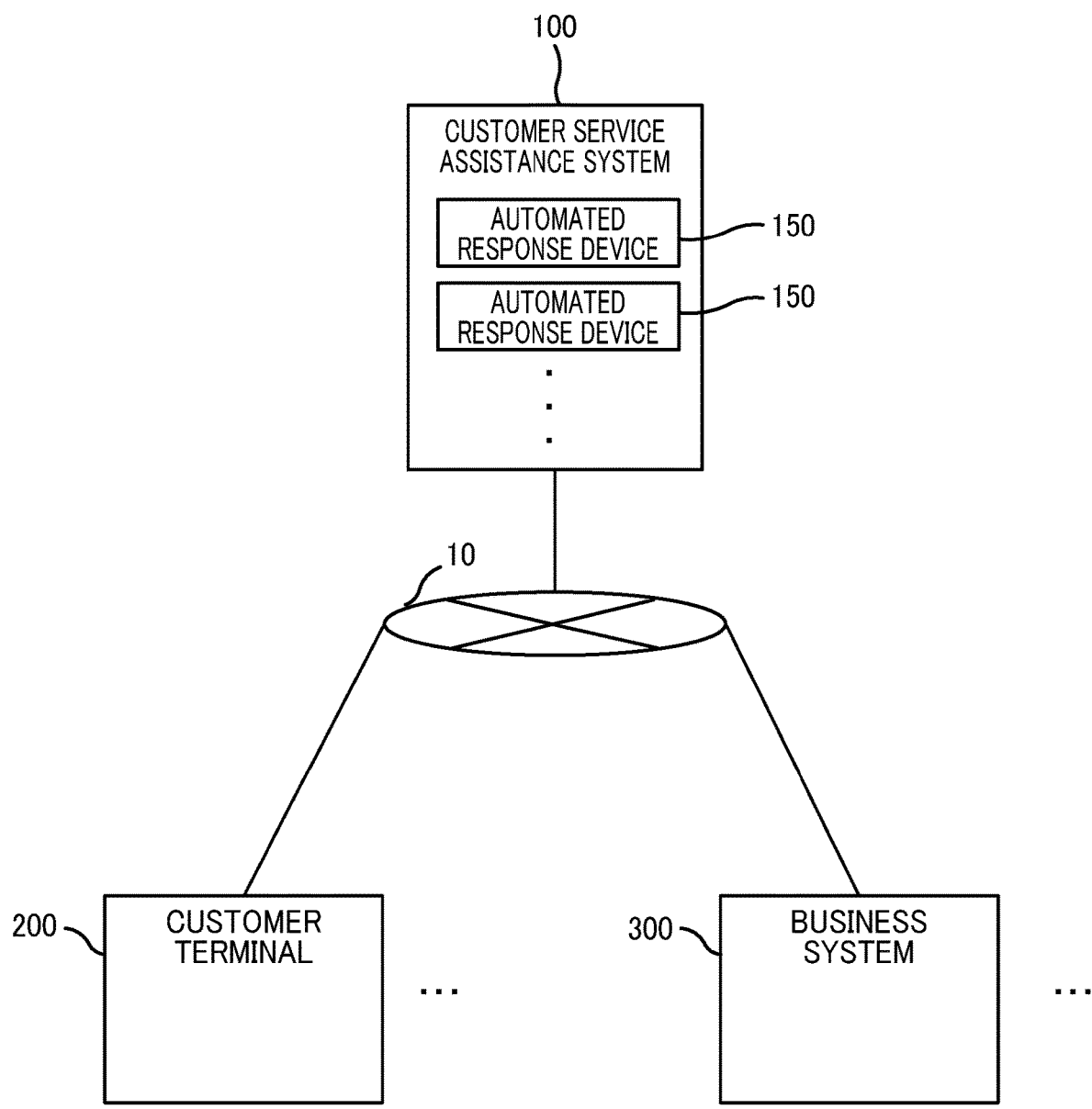
FIG. 1 is a network configuration diagram including a customer service assistance system in an embodiment.

Hereinafter, an embodiment of the present invention is described in detail with reference to the drawings. FIG. 1 is a diagram illustrating a network configuration example including a customer service assistance system 100 of this embodiment. The customer service assistance system 100 illustrated in FIG. 1 is a computer system that enables the efficient performance of a precise understanding of a user intention and automated response with suitable contents.

Here, for example, there is assumed a situation where the customer service assistance system 100 of this embodiment performs the customer service assistance for a business provided by a business system 300 of a financial institution, i.e., a provided business. It is needless to say that the assumed situation is not limited to the above, and there may be various business systems of other kinds of industries.

Such a customer service assistance system 100 is coupled to a network 10 and is capable of data-communicating with a customer terminal 200 and the above-described business system 300.

Here, the customer terminal 200 is a terminal operated by a customer of the above-described financial institution. This customer is, for example, someone who uses a predetermined financial service such as the internet banking service of the financial institution. In this case, the business system 300 is assumed to be an internet banking server that provides the internet banking service.

Note that, the customer terminal 200 may be assumed to be a terminal that can be operated by the customer, which is an information processing device such as not only a general PC but also a smartphone and a tablet terminal.

Additionally, the customer service assistance system 100 includes an automated response device 150 for each business. This automated response device 150 is a device prepared for each of the businesses provided by the above-described business system 300. Each automated response device 150 accumulates knowledge of a corresponding business. It is preferable for the knowledge to include not only general information on a flow, specifications of screen and operation, and so on of the business but also the background to the answer returned to an inquiry from a customer in the business and the like.

For example, in the above-described situation where the customer service assistance is performed for the internet banking server as the business system 300, there is the automated response device 150 for each detailed business included in the internet banking business such as, for example, obtainment of an electronic certificate, fund transfers, ID/PW authentication, and account activity record inquiry. It is needless to say that this is merely an example, and the automated response device 150 may be provided not for each above-described detailed business but for each business provided by a financial institution such as the internet banking service, housing loan, card loan, credit card service, and foreign exchange transactions.

Moreover, there is assumed a so-called chatbot provided with the artificial intelligence as an automated response engine as a specific example of the automated response device 150. The chatbot is for a bi-directional communication between a person operating the customer terminal 200 and the automated response device 150 in which the above-described artificial intelligence responds instead of a person by using a text to the real-time communication from the customer terminal 200 basically using a text.

The automated response device 150 is not limited to the above-described chatbot, and an IVR (Interactive Voice Response) may also be assumed. Note that, in this case, the automated response device 150 as an IVR has a voice-recognition function and converts a voice inquiry from a customer operating the customer terminal 200 into a text to execute a customer service assistance method based on the thus-converted text.

Hardware Configuration Example

Figure 2:
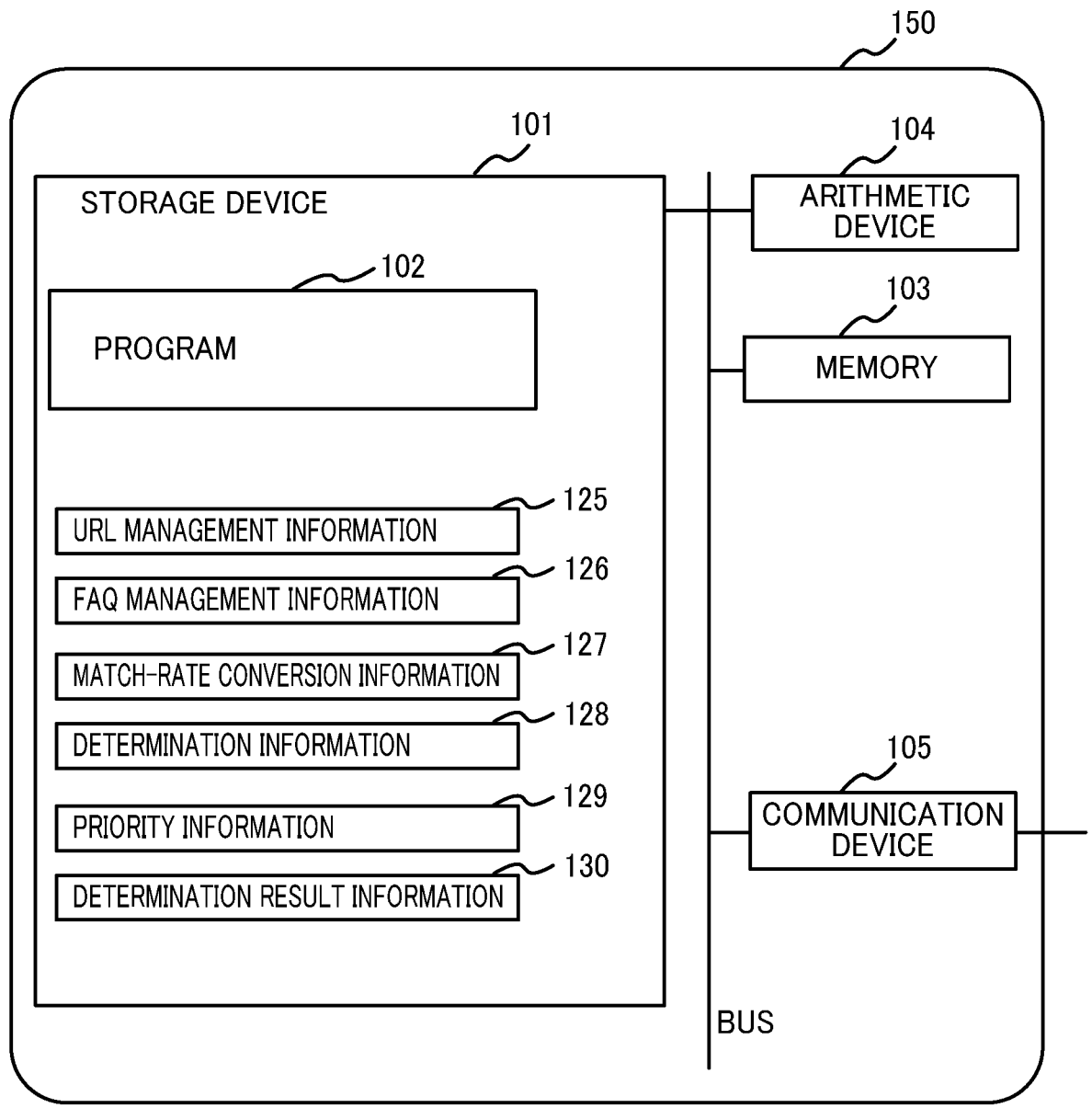
FIG. 2 is a diagram illustrating a hardware configuration example of an automated response device in the customer service assistance system of this embodiment.

Furthermore, a hardware configuration of the automated response device 150 included in the customer service assistance system 100 of this embodiment is as follows. FIG. 2 is a diagram illustrating a hardware configuration example of the automated response device 150 included in the customer service assistance system 100 in this embodiment.

The automated response device 150 includes a storage device 101 including any desired non-volatile storage element such as a hard disk drive, a memory 103 including a volatile storage element such as a RAM, a CPU 104 (arithmetic device) that executes a program 102 held in the storage device 101 by reading the program 102 out to the memory 103 to control the overall system and performs various kinds of determination, computing, and control processing, and a communication device 105 coupled with the network 10 and that assumes the processing of communicating with other devices.

Note that, the above-described storage device 101 holds URL management information 125, FAQ management information 126, match-rate conversion information 127, determination information 128, priority information 129, and determination result information 130. Details of these pieces of information are described later.

Data Configuration Example

Next, databases used by the automated response device 150 in the customer service assistance system 100 of this embodiment are described. FIG. 3 illustrates a data configuration example of the URL management information 125 in this embodiment.

The URL management information 125 of this embodiment is information containing an address, or URL, of the automated response device 150 accumulating the knowledge of the provided business in each output screen in the business system 300 as a target of the inquiry from the customer.

The data configuration is an aggregate of records including data such as a business provided through the output screen, a screen ID, a region ID, and a URL of the automated response device 150, with the URL and the screen ID of each output screen used as a key.

Next, FIG. 4 illustrates a data configuration example of the FAQ management information 126 in this embodiment. The FAQ management information 126 of this embodiment is questions-and-answers information in the present invention and is information containing information on the question and the answer thereto held for each output screen of the business as the target of the customer service in the automated response device 150.

The data configuration is, for example, an aggregate of records including data such as a classification of the processing for the business, a business, a screen ID, a region ID, an error code, a question, and an answer, with a management number uniquely identifying each record used as a key.

In the case of the FAQ management information 126 exemplified in FIG. 4, for example, in the record of a management number "007", the business classification is about "authentication" while the business is "ID/PW authentication", and for a region of "Z001A" in an output screen "Zxxx001" distributed from the business system 300 to the customer terminal 200, the answer that should be returned to the question "I forgot account number~" is defined as "Please contact ○○○", and the answer that should be returned to the question "There appears ○○ error~" is defined as "Please check number of digits and type of letters inputted.".

Additionally, FIG. 5 illustrates a data configuration example of the match-rate conversion information 127 in this embodiment. The match-rate conversion information 127 of this embodiment is information containing information on the points determined according to the match-rate, that is, the degree of similarity between the sentence of each question included in the FAQ management information 126 and an inquiry sentence received from the customer terminal 200.

The data configuration is an aggregate of records associated with values of the points that should be applied to (the record of) the question of the above-described match-rate, with the match-rate used as a key.

Moreover, FIG. 6 illustrates a data configuration example of the determination information 128 in this embodiment. The determination information 128 of this embodiment is points respectively related to: whether a screen associated with each question included in the above-described FAQ management information 126 matches an output screen indicated by the inquiry received from the above-described customer terminal 200; the degree of similarity between the sentence of each question included in the FAQ management information 126 and the sentence of the above-described inquiry; and whether an error code associated with each question included in the FAQ management information 126 matches the latest error code (included in the operation history) about the above-described customer obtained from the business system 300, the points being contained for each record, or each record of the FAQ management information 126.

The data configuration is an aggregate of records associated with values such as the management number of the question, a determination point as a total value of the points, a screen matching point, an error code matching point, and a question contents matching point, with the priority according to the magnitude of the above-described total value used as a key.

Here, the screen matching point is the point that is applied depending on whether the screen associated with each question included in the FAQ management information 126 matches the output screen indicated by the inquiry received from the above-described customer terminal 200, and "30" points are applied if the screens match with each other, for example.

Furthermore, the error code matching point is the point that is applied depending on whether the error code associated with each question included in the FAQ management information 126 matches the latest error code (included in the operation history) about the above-described customer obtained from the business system 300, and "30" points are applied if the error codes match with each other, for example.

Additionally, the question contents matching point corresponds to the point determined based on the above-described match-rate conversion information 127 according to the degree of similarity between the sentence of each question included in the FAQ management information 126 and the sentence of the above-described inquiry.

Moreover, FIG. 7 illustrates a data configuration example of the priority information 129 in this embodiment. The priority information 129 of this embodiment is information defining the priority between the items in the above-described determination information 128, which are the screen matching point, the error code matching point, and the question contents matching point.

The data configuration is an aggregate of records associated with values of the priority of the above-described items, with the items used as a key. In the case of the example illustrated in FIG. 7, the screen matching point is defined to have the priority of the "first" place, the error code matching point is defined to have the priority of the "second" place, and the question contents matching point is defined to have the priority of the "third" place.

Note that, the determination result information 130 stored in the storage device 101 is described later with the description of the customer service assistance method based on the following flow example.

Flow Example

Hereinafter, the actual procedure of the customer service assistance method in this embodiment is described with reference to the drawing. The various operations corresponding to the customer service assistance method described below are implemented by programs that are executed with the customer service assistance system 100 reading the programs out to the memory 103. In addition, the programs include codes for performing the various operations described below.

Figure 8:
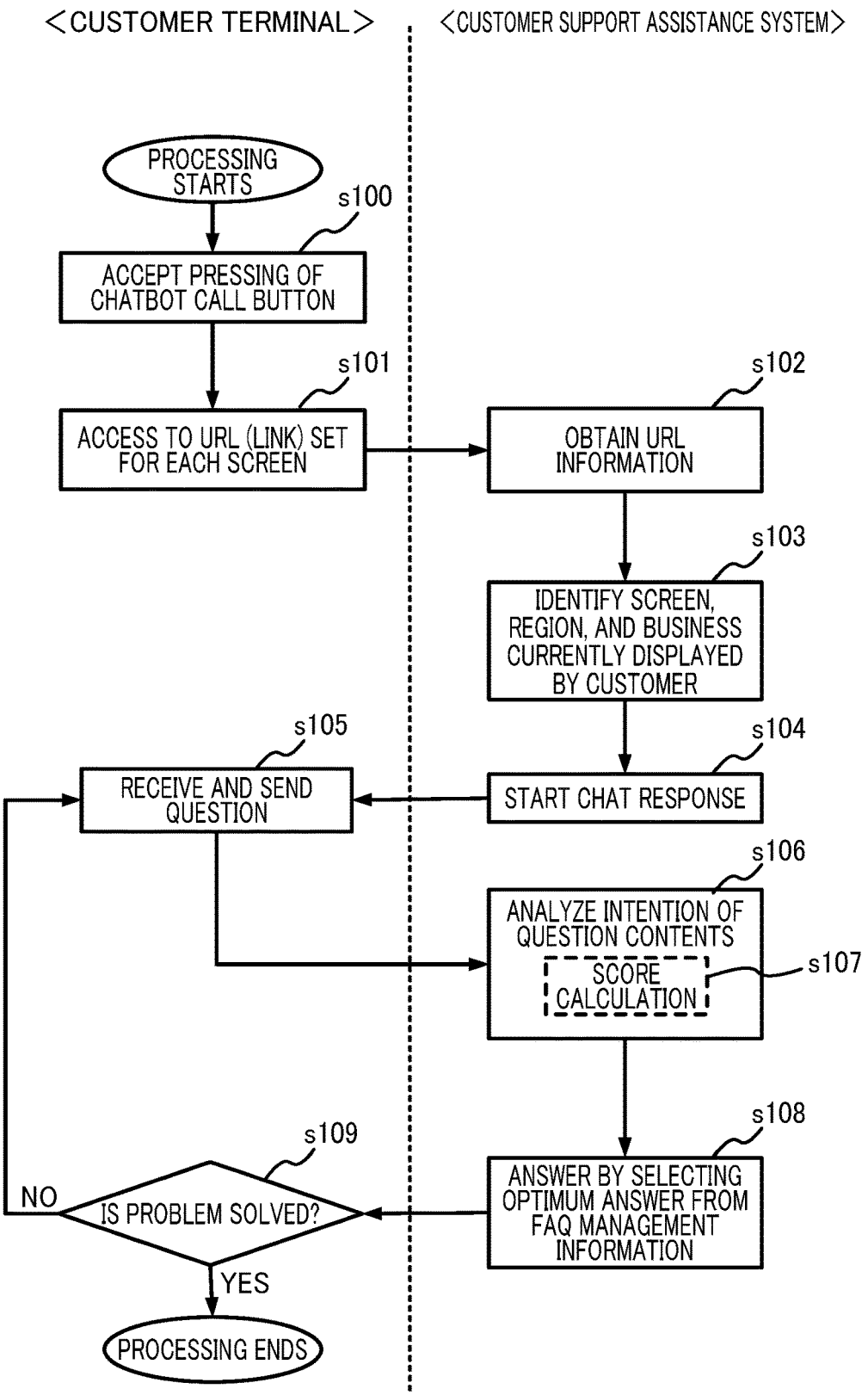
FIG. 8 is a diagram illustrating a flow example 1 of a customer service assistance method of this embodiment.

FIG. 8 is a diagram illustrating a flow example of the customer service assistance method in this embodiment. Here is assumed a situation where a customer of a certain financial institution operates the own customer terminal 200 and makes an inquiry about trouble or an unclear point facing in the operation of a predetermined screen while using the internet banking service. Additionally, the automated response device 150 exemplified herein is a device having the function of the chatbot and is a device performing the automated response by the chatbot function to an inquiry from a customer about the internet banking business out of the several businesses in the above-described financial institution.

In this case, in response to a click operation by the customer performed on a chatbot call button 1010 arranged on the above-described predetermined screen (see a screen 100 in FIG. 9A) (s100), the above-described customer terminal 200 accesses a predetermined address in the network 10 designated by a URL associated with the chatbot call button 1010 (s101). This URL is a URL as an access destination toward any one of the automated response devices 150 in the customer service assistance system 100.

Figure 9A:
FIG. 9A is a diagram illustrating a screen example 1 in this embodiment.

The customer browsing the screen 1000 in FIG. 9A through the customer terminal 200 is under a situation where the customer recognizes an error message that is "Error occurs (error code 5002E)" and presses the chatbot call button 1010.

Figure 9B:
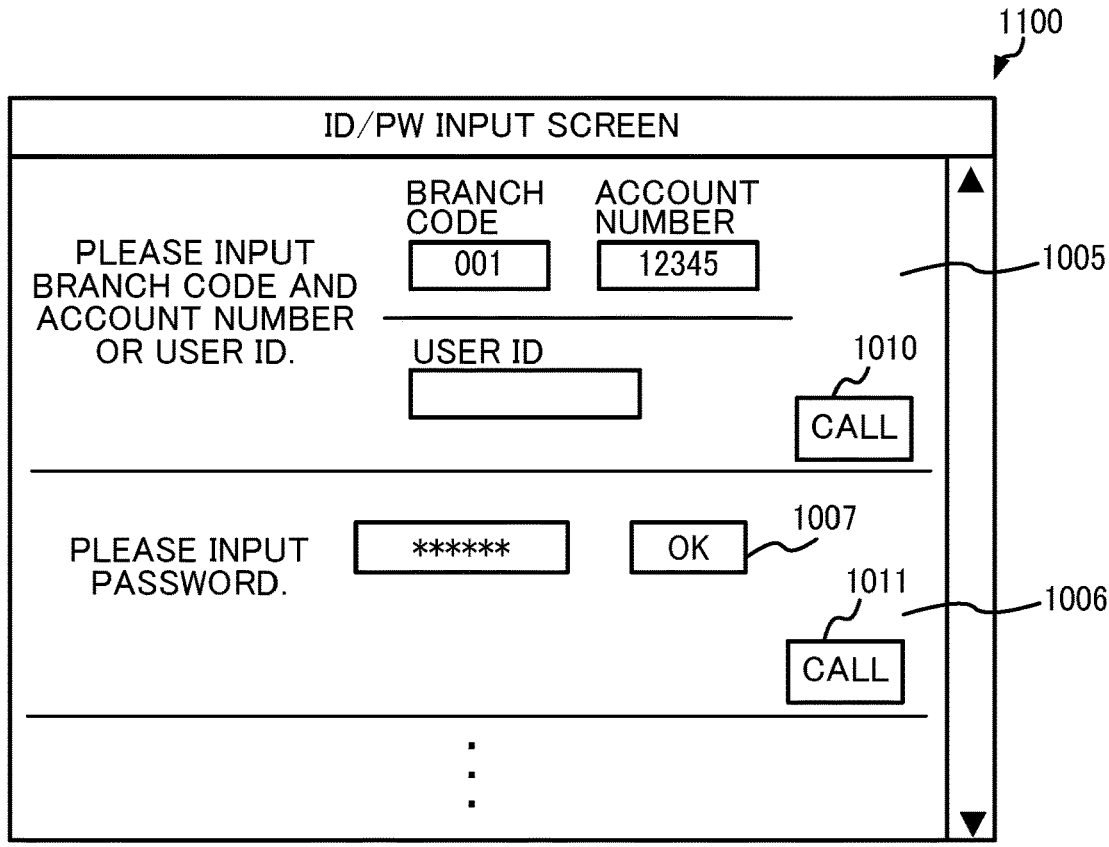
FIG. 9B is a diagram illustrating a screen example 2 in this embodiment.

Note that, a trigger of displaying the above-described screen 1000 may be assumed to be a case where, for example, the customer tries to use the internet banking service and to input own authentication information on an "ID/PW input screen" like a screen 1100 illustrated in FIG. 9B as a part of the login operation but does not know how to input the information into either of a region 1005 for inputting a branch code and an account number or a user ID or a region 1006 for inputting a password, and the customer thus presses a chatbot call button 1010 or 1011.

Otherwise, a trigger of displaying the above-described screen 1000 may be assumed to be a case where, for example, an error occurs as a result of completing the input of required information into the region 1005 and the region 1006 on the screen 1100 illustrated in FIG. 9B and pressing an OK button 1007.

On the other hand, the automated response device 150 in the customer service assistance system 100 accepts the access from the above-described customer terminal 200, that is, the access to the above-described URL (s102) and checks this URL against the URL management information 125 (FIG. 5) to identify the screen ID, the corresponding region IDs, and the business of the screen currently displayed on the customer terminal 200 (s103). Note that, when multiple regions are set in the screen as exemplified in FIG. 5, the region IDs are associated with the screen. Thus, even in the processing in s103, the region IDs are identified only when the screen corresponding to the target URL includes multiple regions.

Figure 9C:
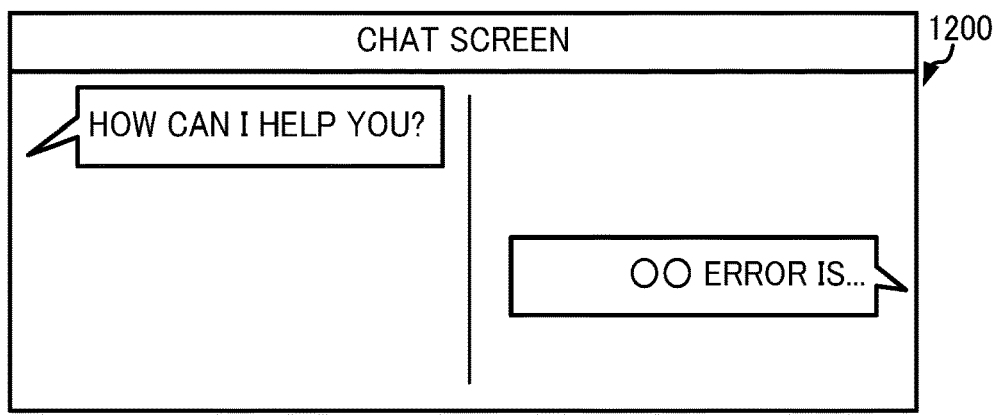
FIG. 9C is a diagram illustrating a screen example 3 in this embodiment.

Next, the above-described automated response device 150 calls the own chatbot function and distributes an interface for a chat generated by the chatbot function (see a screen 1200 in FIG. 9C) to the above-described customer terminal 200 (s104). Note that, the automated response device 150 can execute a program corresponding to the chatbot function in the memory or the like to implement a required function.

In this process, the above-described customer terminal 200 receives the input of a question from the customer and sends this to the automated response device 150 through the above-described screen 1200 (s105).

On the other hand, the automated response device 150 receives the above-described question, checks the inquiry sentence indicated by the question (inquiry) and the pieces of information identified in the above-described s103 that are the screen ID, the region IDs (if they are identified), and the business against the FAQ management information 126, and analyses the question intention of the customer (s106).

In this case, first, the automated response device 150 checks the pieces of information identified in the above-described s103 that are the screen ID, the region IDs (if they are identified), and the business against each record in the FAQ management information 126 to identify a record including at least either the screen ID or the region IDs and the business match with the information identified in s103. For example, if the values of the screen ID "Zxxx001" and the business "ID/PW authentication" have been identified in s103, it is possible to identify the records of the management numbers "007" and "008" according to the FAQ management information 126 in FIG. 4.

Moreover, the automated response device 150 extracts the values as "I forgot account number~" and "There appears ○○ error~", that is, the question sentences from the "question" fields of the records. Then, the automated response device 150 determines the similarity between each of these question sentences and the inquiry sentence indicated by the question received from the customer terminal 200 in s106. The existing similarity determination method such as the cosine similarity may be arbitrarily adopted as the method of determining the similarity between the sentences, and the method is not limited. As a result of the similarity determination as described above, a question sentence that is highly similar to the inquiry sentence of the question received from the customer terminal 200 is identified, and a value in the "answer" field of the record corresponding to the question sentence, that is, the record of either the management number "007" or "008" in the above case, is read to give the thus-read record as the answer to the customer terminal 200 (s108).

On the other hand, the customer terminal 200 receives and displays the above-described answer as a target of the determination on right or wrong by the customer. Then, the customer terminal 200 receives an instruction from the customer indicating whether the problem about the question asked in s100 is solved (s109).

If the instruction received in this process indicates that "problem is solved" (s109: YES), the customer terminal 200 terminates the processing.

On the other hand, if the instruction received in this process indicates that "problem is not solved" (s109: NO), the customer terminal 200 returns the processing to s105. In this case, the automated response device 150 repeats the processing of s106 and thereafter.

Figure 10:
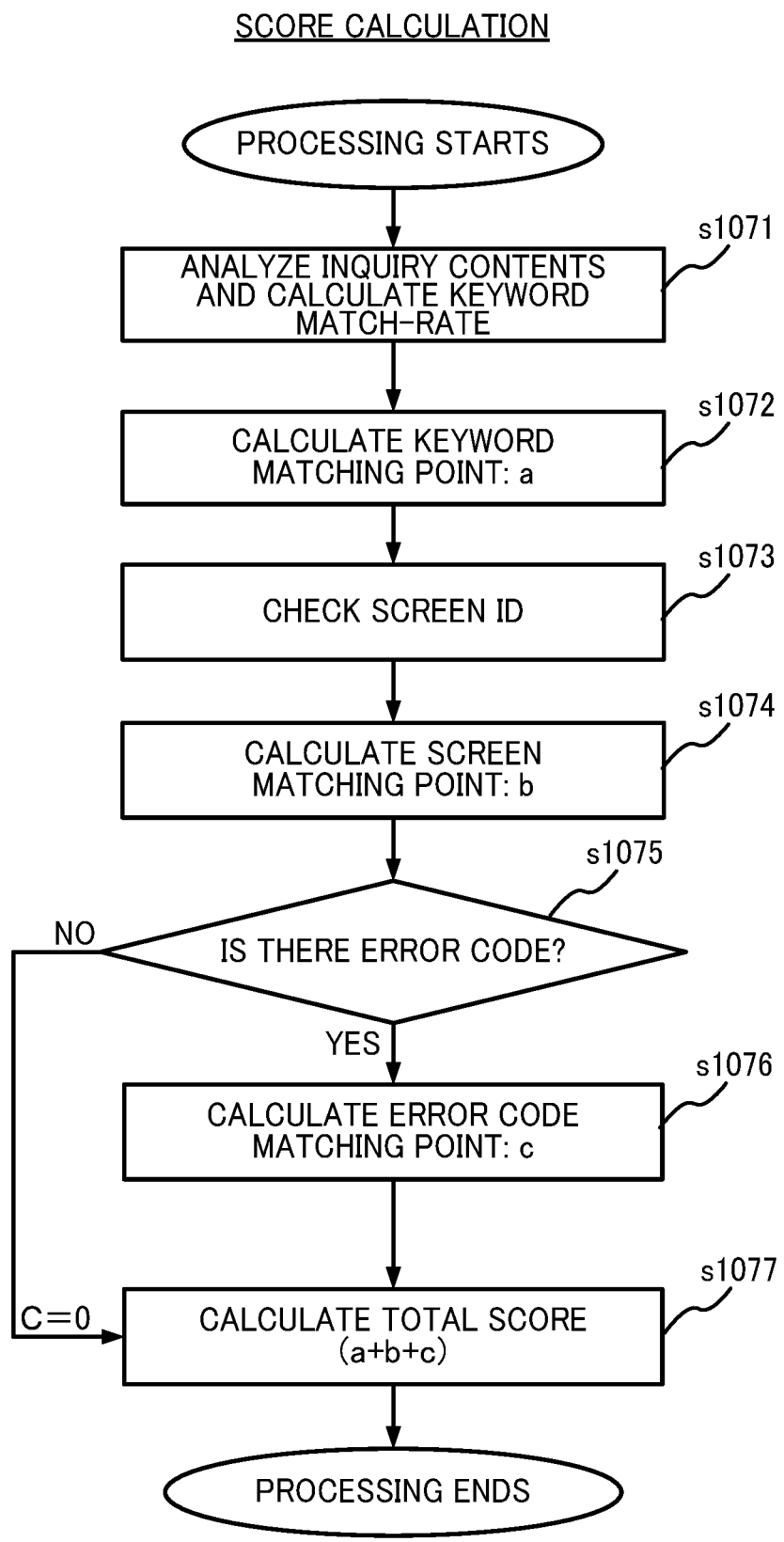
FIG. 10 is a diagram illustrating a flow example 2 of the customer service assistance method of this embodiment.

Note that, score calculation (s107) may be performed in the processing in the above-described s106. A flow example of this score calculation is illustrated in FIG. 10. FIG. 10 is a diagram illustrating a flow example 2 of the customer service assistance method of this embodiment.

In this case, the automated response device 150 determines the similarity of the sentence of the "question" and the inquiry sentence in the question received from the customer terminal 200 in s106 between the records in the FAQ management information 126 that are, for example, the records that can be each identified based on the FAQ management information 126 using the screen ID identified in the above-described s103, by the cosine similarity or the like (s1071) and checks the value of this similarity as the match-rate against the match-rate conversion information 127 to identify the matching point (s1072).

Next, if the screen ID of each record that can be identified based on the FAQ management information 126 as described above matches the screen ID identified in the above-described s103, the automated response device 150 identifies "30" points as the screen matching point for the record (s1073 and s1074).

Furthermore, the automated response device 150 determines whether a predetermined error code is obtained about the customer from the business system 300 for each record that can be identified based on the above-described FAQ management information 126 (S1075).

As a result of the above determination, the automated response device 150 adds up the points obtained in the above-described s1072 and s1074 for a record in which the error code is not obtained (S1075: No), sets the sum as the total score of the record (s1077), and terminates the processing.

On the other hand, as a result of the above determination, the automated response device 150 applies "30" points as the error code matching point to the record in which the error code is obtained (S1075: Yes) (s1076), adds the error code matching point to the total value of the points obtained in the above-described s1072 and s1074 to set the sum as the total score of the record (s1077), and terminates the processing.

In the above-described s108, the automated response device 150 recognizes the record with the highest total score obtained in s1077 as a record corresponding to an optimum answer out of the records of the FAQ management information 126, reads the value of the "answer" field of the record, and answers the read value to the customer terminal 200.

Figure 11:
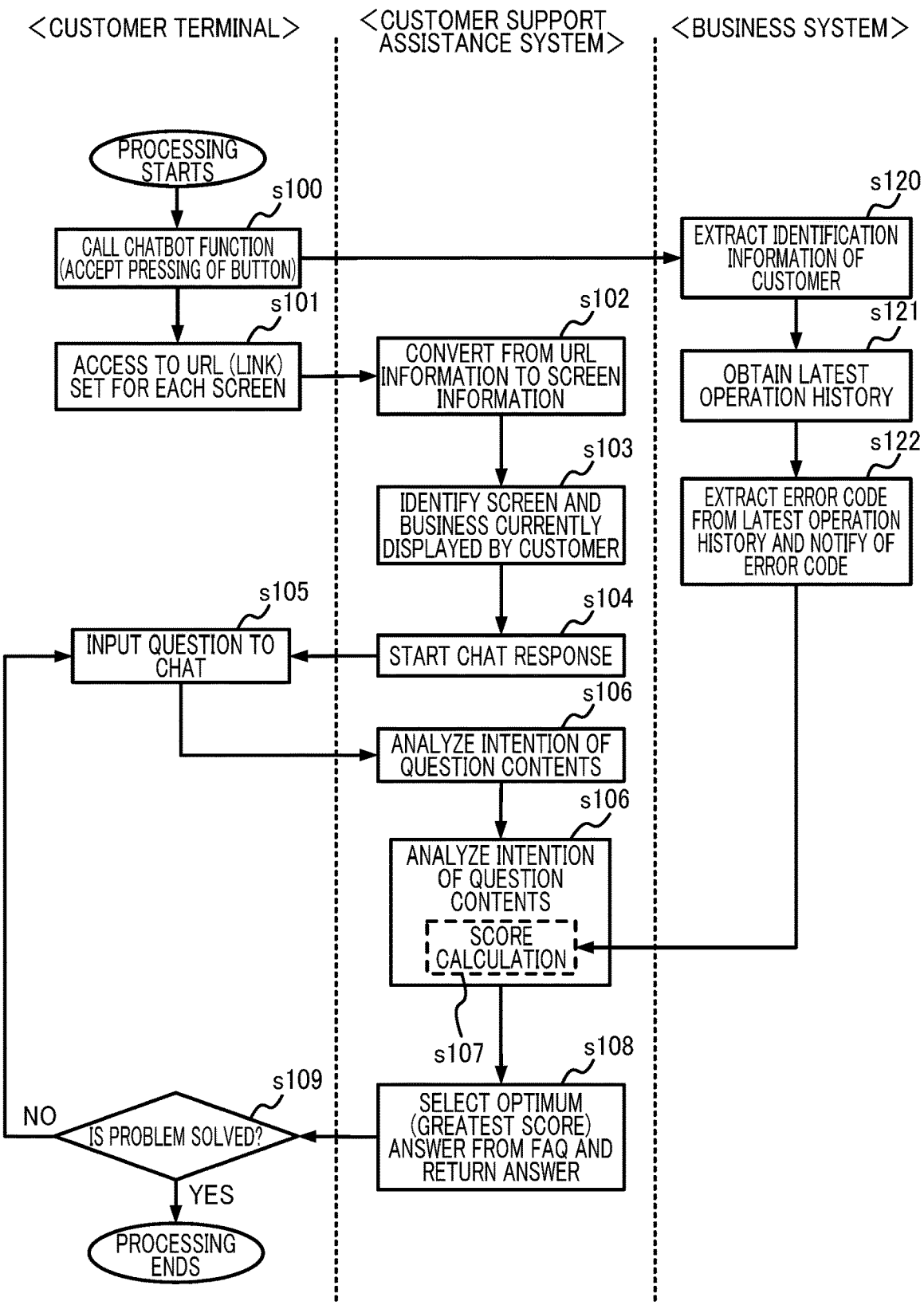
FIG. 11 is a diagram illustrating a flow example 3 of the customer service assistance method of this embodiment.

Note that, in the above-described obtainment of the error code, the customer terminal 200 transmits the identification information of the customer to the business system 300 in response to the click operation of the chatbot call button 1010 through the customer terminal 200 as illustrated in a flow example of FIG. 11, for example.

On the other hand, in response to the above process, the business system 300 uses this identification information of the customer as a key to execute searching with the operation history information of each customer managed by itself and obtains the operation history that has been obtained for a predetermined time period from the current clock time, which is the last 30 minutes for example (s121).

Additionally, if the operation history obtained in s121 includes an error code, the business system 300 extracts the error code and notifies the automated response device 150 of the customer service assistance system 100 of the error code (s122). In this way, the automated response device 150 can obtain the error code and uses the error code for the processing in s107.

Note that, the determination result information 130 generated by the automated response device 150 through the processing in s107 in the flow of FIG. 8 is exemplified in FIG. 12. The determination result information 130 in this embodiment illustrated in FIG. 12 is an aggregate of records including not only the items of the FAQ management information 126 but also the items such as the screen matching point, the error code matching point, the question contents matching point, and the total score that are the computation result of the score calculation (s107).

In the example described herein, as a result of the calculation of the points and the total score of each record of the management numbers "007" and "008", in the above-described s108, the record "008" of the total score of "70" points is identified, the value in the "answer" field of the record that is "Please check number of digits and type of letters inputted." is read, and the thus-read value is answered to the customer terminal 200.

According to the customer service assistance system of this embodiment, it is possible to efficiently perform a precise understanding of a user intention and automated response with suitable contents.

At least the followings are apparent according to the description of this specification. Specifically, in the customer service assistance system of this embodiment, in the processing of estimating a question matching an intention of the inquiry, the arithmetic device may obtain the latest operation history in the business system by the customer terminal from the business system, and when the operation history includes an error code, may check the error code against the questions-and-answers information and estimate a question matching an intention of the inquiry out of the questions in the questions-and-answers information further according to whether the error code matches an error code associated with each question included in the questions-and-answers information.

Accordingly, it is possible to estimate the intention of the inquiry more accurately by referring not only the output screen of the business system and the inquiry sentence but also the event that is actually operated by the customer on the business system. Therefore, it is possible to efficiently perform a more precise understanding of a user intention and automated response with suitable contents.

Moreover, in the customer service assistance system of this embodiment, the storage device may further store, for each predetermined region in each output screen, an address of an automated response device accumulating knowledge of a provided business in the predetermined region, and in the processing of estimating a question matching an intention of the inquiry, when an inquiry specifying the address is received from the customer terminal, the arithmetic device may check identification information of the output screen and of a region in the output screen and an inquiry sentence indicated by the inquiry against questions-and-answers information held for each output screen of the provided business in the automated response device associated with the address, and may estimate a question matching an intention of the inquiry out of questions in the questions-and-answers information according to whether a region of a screen associated with each question included in the questions-and-answers information matches the region of the output screen and a degree of similarity between a sentence of each question included in the questions-and-answers information and the inquiry sentence.

Accordingly, it is possible to receive the inquiry for each region including the item to which the customer desires to make an inquiry in the single output screen and to efficiently perform the automated response suitable for the inquiry. Therefore, it is possible to efficiently perform a further precise understanding of a user intention and automated response with suitable contents.

Additionally, in the customer service assistance method of this embodiment, in the processing of estimating a question matching an intention of the inquiry, the information processing system may obtain the latest operation history in the business system by the customer terminal from the business system, and when the operation history includes an error code, may check the error code against the questions-and-answers information and estimate a question matching an intention of the inquiry out of the questions in the questions-and-answers information further according to whether the error code matches an error code associated with each question included in the questions-and-answers information.

Moreover, in the customer service assistance method of this embodiment, in the storage device, the information processing system may further store, for each predetermined region in each output screen, an address of an automated response device accumulating knowledge of a provided business in the predetermined region, and in the processing of estimating a question matching an intention of the inquiry, when an inquiry specifying the address is received from the customer terminal, the information processing system may check identification information of the output screen and of a region in the output screen and an inquiry sentence indicated by the inquiry against questions-and-answers information held for each output screen of the provided business in the automated response device associated with the address, and may estimate a question matching an intention of the inquiry out of questions in the questions-and-answers information according to whether a region of a screen associated with each question included in the questions-and-answers information matches the region of the output screen and a degree of similarity between a sentence of each question included in the questions-and-answers information and the inquiry sentence.

REFERENCE SIGNS LIST 10 network
100 customer service assistance system
101 storage device
102 program
103 memory
104 CPU (arithmetic device)
105 communication device
125 URL management information
126 FAQ management information
127 match-rate conversion information
128 determination information
129 priority information
130 determination result information
150 automated response device
200 customer terminal
300 business system

The invention claimed is:

1. A customer service assistance system, comprising:
a storage device that stores, for each output screen in a business system as a target of inquiry from a customer terminal, a Uniform Resource Locater (URL) of an automated response device accumulating knowledge of a provided business in the output screen; and
a processor that, when an inquiry specifying the URL is received from the customer terminal, executes processing of checking identification information of the output screen and an inquiry sentence indicated by the inquiry against questions-and-answers information held for each output screen of the provided business in the automated response device associated with the URL, and estimating a question matching an intention of the inquiry out of questions in the questions-and-answers information according to:
a question content matching point value calculated based on a degree of similarity between a sentence of each question included in the questions-and-answers information and the inquiry sentence;
a screen matching point value calculated based on whether a screen ID associated with each question included in the questions-and-answers information matches the screen ID of the output screen indicated by the inquiry; and
an error code matching point value which is based on whether an error code associated with each question included in the questions-and-answers information matches a latest error code included in a latest operation history of the customer terminal in the business system as obtained by the processor from the business system,
wherein, the processor checks the latest error code against the questions-and-answers information and estimates a question matching an intention of the inquiry out of the questions in the questions-and-answers information further according to whether the latest error code matches one of the error codes associated with each question, respectively, included in the questions-and-answers information,
wherein the processor sums up the question content matching point value, the screen matching point value and the error code matching point value to determine the estimated question,
wherein the storage device further stores, according to a region ID for each predetermined region in each output screen, the URL of the automated response device accumulating knowledge of a provided business in the predetermined region, wherein, in the processing of estimating a question matching an intention of the inquiry, when an inquiry specifying the URL is received from the customer terminal, the processor checks identification information of the output screen and of the region ID in the output screen and an inquiry sentence indicated by the inquiry against questions-and-answers information held for each output screen of the provided business in the automated response device associated with the URL, and estimates a question matching an intention of the inquiry out of questions in the questions-and-answers information according to whether a region ID of a screen associated with each question included in the questions-and-answers information matches the region ID of the output screen and a highest calculated sum of the question content matching point value, the screen matching point value and the error code matching point value, and
wherein the processor executes processing of extracting an answer to the question which has been estimated from the questions-and-answers information based on the region ID and the highest calculated sum and returning the answer to the customer terminal.

2. A customer service assistance method performed by a customer service assistance system including a storage device that stores, for each output screen in a business system as a target of inquiry from a customer terminal, a Uniform Resource Locater (URL) of an automated response device accumulating knowledge of a provided business in the output screen, the method comprising the steps of:
> when an inquiry specifying the URL is received from the customer terminal, executing processing, by a processor, of checking identification information of the output screen and an inquiry sentence indicated by the inquiry against questions-and-answers information held for each output screen of the provided business in the automated response device associated with the URL, and estimating a question matching an intention of the inquiry out of questions in the questions-and-answers information according to:
> a question content matching point value calculated based on a degree of similarity between a sentence of each question included in the questions-and-answers information and the inquiry sentence;
> a screen matching point value calculated based on whether a screen associated with each question included in the questions-and-answers information matches the output screen indicated by the inquiry; and
> an error code matching point value which is based on whether an error code associated with each question included in the questions-and-answers information matches a latest error code included in a latest operation history of the customer terminal in the business system as obtained from the business system;
> checking, by the processor, the latest error code against the questions-and-answers information and estimates a question matching an intention of the inquiry out of the questions in the questions-and-answers information further according to whether the latest error code matches one of the error codes associated with each question, respectively, included in the questions-and-answers information,
> summing up, by the processor, the question content matching point value, the screen matching point value and the error code matching point value to determine the estimated question;
> storing in the storage device, according to a region ID for each predetermined region in each output screen, the URL of the automated response device accumulating knowledge of a provided business in the predetermined region;
> in the step of estimating a question matching an intention of the inquiry, when an inquiry specifying the URL is received from the customer terminal, checking, by the processor, identification information of the output screen and of the region ID in the output screen and an inquiry sentence indicated by the inquiry against questions-and-answers information held for each output screen of the provided business in the automated response device associated with the URL, and estimating, by the processor, a question matching an intention of the inquiry out of questions in the questions-and-answers information according to whether a region ID of a screen associated with each question included in the questions-and-answers information matches the region ID of the output screen and a highest calculated sum of the question content matching point value, the screen matching point value and the error code matching point value; and
> executing, by the processor, processing of extracting an answer to the question which has been estimated from the questions-and-answers information based on the region ID and the highest calculated sum and returning the answer to the customer terminal.

* * * * *